(12) United States Patent
Wei

(10) Patent No.: US 6,654,784 B1
(45) Date of Patent: Nov. 25, 2003

(54) COMPUTING ARCHITECTURE

(75) Inventor: Coach Wei, Framingham, MA (US)

(73) Assignee: Nexaweb Technologies, INC

( * ) Notice: Subject to any disclaimer, the term of this patent is extended or adjusted under 35 U.S.C. 154(b) by 0 days.

(21) Appl. No.: 09/483,405

(22) Filed: Jan. 14, 2000

(51) Int. Cl.[7] .............................................. G06F 15/16
(52) U.S. Cl. ...................................... 709/203; 715/513
(58) Field of Search ................................ 709/203, 204, 709/328, 330; 715/513; 705/513

(56) References Cited

U.S. PATENT DOCUMENTS

| | | | | | |
|---|---|---|---|---|---|
| 5,623,656 | A | * | 4/1997 | Lyons | 707/10 |
| 5,915,001 | A | * | 6/1999 | Uppaluru | 379/88.22 |
| 5,987,256 | A | * | 11/1999 | Wu et al. | 717/146 |
| 6,058,482 | A | * | 5/2000 | Liu | 713/201 |
| 6,105,067 | A | * | 8/2000 | Batra | 709/227 |
| 6,125,387 | A | * | 9/2000 | Simonoff et al. | 709/218 |
| 6,144,990 | A | * | 11/2000 | Brandt et al. | 709/203 |
| 6,216,157 | B1 | * | 4/2001 | Vishwanath et al. | 709/208 |
| 6,233,577 | B1 | * | 5/2001 | Ramasubramani et al. | 707/9 |
| 6,317,782 | B1 | * | 11/2001 | Himmel et al. | 709/218 |
| 6,347,340 | B1 | * | 2/2002 | Coelho et al. | 709/246 |
| 6,366,916 | B1 | * | 4/2002 | Baer et al. | 707/10 |
| 6,369,821 | B2 | * | 4/2002 | Merrill et al. | 345/473 |
| 6,430,564 | B1 | * | 8/2002 | Judge et al. | 707/100 |
| 6,438,592 | B1 | * | 8/2002 | Killian | 709/224 |
| 6,446,109 | B2 | * | 9/2002 | Gupta | 709/203 |
| 6,456,308 | B1 | * | 9/2002 | Agranat et al. | 345/854 |
| 6,457,065 | B1 | * | 9/2002 | Rich et al. | 709/328 |
| 6,470,447 | B1 | * | 10/2002 | Lambert et al. | 713/151 |
| 2002/0026349 | A1 | * | 2/2002 | Reilly et al. | 705/14 |
| 2002/0087383 | A1 | * | 7/2002 | Cogger et al. | 705/10 |
| 2003/0014326 | A1 | * | 1/2003 | Ben-Meir et al. | 705/26 |
| 2003/0041280 | A1 | * | 2/2003 | Malcolm et al. | 714/4 |
| 2003/0061323 | A1 | * | 3/2003 | East et al. | 709/223 |

OTHER PUBLICATIONS

Robert Zembowicz, "Developing Applications with Java IIS, and ASP", www.robertz.com/papers/aspmarch 1998, Mar. 1998, pp. 1–24.*

Robert Zembowicz, "Object Modeling with UML", www.robertz.com, (c)1998, 60 pages.*

* cited by examiner

*Primary Examiner*—Bunjob Jaroenchonwanit
(74) *Attorney, Agent, or Firm*—AKC Patents; Aliki K. Collins

(57) ABSTRACT

A computer system for executing a rich application over a network connection includes a backend server connected to an application server, a web server connected to the application server and to a client machine. The backend server stores and executes the rich application, which includes a Graphical User Interface (GUI) having a set of controls used to control and execute the application. The application server receives and converts information of the GUI into one or more web pages and one or more client side scripts. A client foundation class running at the client machine receives and converts the one or more web pages and the client side scripts into an application user interface, and executes the client-side scripts thereby controlling interactions of a user with the application user interface. The application user interface includes at least one of the GUI controls.

30 Claims, 3 Drawing Sheets

COMPUTING ARCHITECTURE

Appendix A containing a computer program listing is submitted on two identical compact disks. Each compact disk contains a file entitled Appendix A.doc. The file is a Microsoft Word document created on Apr. 8, 2003 and is 255 KB in size. Appendix A is hereby incorporated by reference.

FIELD OF THE INVENTION

This invention relates to computing architecture, and more particularly to a method and apparatus for running applications solely on a backend server, with the Graphical User Interface of the application running on the client machine in the form of HTML-based web pages.

BACKGROUND OF THE INVENTION

Computing, in general, can be classified into two categories: Personal Computing and Enterprise Computing. Enterprise Computing, is concerned with the computing activities of an organization and the information infrastructure, including hardware, software and services to support these activities. An organization's computing activity includes not only that associated with each individual within the organization, but also the collaboration among different members or groups which requires access of different members to different computing resources. Also involved is the collaboration and interaction with other related organizations. In short, Enterprise Computing relates to the information infrastructure to provide each individual entity with access to the right application and data at the right time and the right place.

Traditionally, the architecture of Enterprise Computing is client/server computing, especially Fat Client Computing. Fat Client Computing refers to a computing model in which applications run on both client and server machines, either stored locally or downloaded. Data is also stored locally. A high bandwidth network is used to provide communication between the server and client. In short, Fat Client Computing requires that both the client and server possess enough computing power to run an application and a high bandwidth communication mechanism.

Today, Fat Client Computing is ubiquitous, typically involving server machines such as the Unix/WinNT server, client machines such as PCs running Windows OS, and connectivity being either a high speed LAN or WAN. Though it offers flexibility and lower initial acquisition cost than its predecessors, there are problems associated with Fat Client Computing.

The main concern is the total cost of ownership. Currently the following are four main problems associated with enterprise computing due to its Fat Client Computing architecture:

From a management perspective, traditional enterprise-wide application deployment is often time-consuming, expensive and difficult to maintain. Not only do administrators have to physically distribute applications to every client machine, they also have to deal with version control issues, remote support, multiple system configurations, data replication and protection. When confronted with thousands of users, the cost of application ownership is quickly out of control.

Today's corporate IT system comprises of a mix of heterogeneous hardware systems and platforms, network connectivity and operating systems. Many applications run on only a certain platform and are installed on only certain computer systems that people from other platforms or other computer systems have problems in accessing. Workers spreading around the world want to access the same set of data and information such as employee information. Companies want to let customers and suppliers access some information traditionally only available within the company, such as order status, but with no idea of what kind of computer system their customers and suppliers are using.

Moreover, most corporate applications today are designed for high speed networks and powerful computer systems. This type of design puts tremendous strain on corporate networks, and the growth of the network bandwidth cannot keep up with demand. Additionally, this type of design yields poor performance on lower bandwidth networks, or is even impossible to run due to bandwidth limitations. Moreover, much of the time, a slow network such as the Internet is the only available connection. Because of this, many users simply refuse to use vital applications and access vital data to get their work done. When this happens, redundant work and significant decreases in productivity may incur.

Additionally, security is a big challenge. In the current enterprise computing architecture, critical applications and data reside both on clients and servers. They are distributed over the whole enterprise. Not only does this increase the risk of unauthorized access to critical information, but also the distributed nature of the applications and data increases the risk of loss or stolen information.

Due to the problems of Fat Client Computing, another computing architecture, called Thin Client Computing, is gaining momentum. Thin Client Computing is a generic term used to describe a group of rapidly emerging technologies that attempt to solve the problems of Fat Client Computing and provide a reduction in total cost though a combination of reduced hardware cost, reduced maintenance and support cost, reduced LAN/WAN bandwidth requirements, reduced down time, improved performance and enhanced security.

Thin Clients bear a resemblance to the dumb terminals in the mainframe age. They rely on the server in order to operate. Most, or, 100%, of the applications run on the server, while the Thin Client acts only as a user interface.

Currently the most widely accepted Thin Client Computing model is based on X-Windows, Microsoft Terminal Server and Citrix technologies. This computing model completely separates an application from its user interface. While the application is 100% running on the server, its user interface is presented on the client machine, which is purely used for user interaction. The user's input, such as keyboard strokes/mouse movements, originate at the client machine and are transmitted back to the server via the network. The server's application processes these events and sends its output to the client machine. The communication between client and server is through well-established protocols.

A protocol is a mutually agreed way to present display information and user input information. If the server is a Unix or Linux machine, the protocol will be the X-Windows Protocol. If the server is a Windows machine, the protocol will be the Microsoft Remote Display Protocol, RDP, or Citrix Independent Computing Architecture, ICA. Currently there are three kinds of clients: ie. a native client, a Java client and a web-client.

A native client means that the client program is a native program running on the client machine's operating system. If the client machine uses a Windows system, the client program has to be a Windows program. A Java client means that the client program is written in Java. By leveraging Java's "Write Once Run Anywhere" capability, a Java client is not limited to a particular kind of Operating System. A web client means that the client program is running inside a web browser, and is either a Java Applet/ActiveX or a browser plugin.

Thin Client Computing in general solves the problems associated with Fat Client Computing by compressing bandwidth and making the client program much smaller. Moreover, Thin Client systems rely on Java so that users do not need to install the program. One simply goes to the web browser and launches the program using Java applets. This implies that applications and data can be centrally managed and maintained.

Nevertheless, Thin Client Computing also has its own set of problems.

First, Thin Client Computing still requires a reasonable network bandwidth, which is higher than the current Internet. Most of the time, the user still needs to install a client program on his/her computer, which is exactly what Thin Client Computing trying to avoid, though the program is much smaller than Fat Client programs. In some cases, the user may not need to install a client program on his/her computer by running a Java Applet or ActiveX based client program, which is downloaded over the network and no installation is required. This is an improvement, but major disadvantages are preventing it from being widely adopted.

Secondly, Java Applet/ActiveX based client programs are not too small, usually close to mega bytes in size. Downloading this size program takes a not small amount of time over corporate networks, and takes over 1 minute or several minutes over the Internet. Moreover, the user has to do this each time an application is to be run. What's more, the applet needs to be initialized. For instance, the Java Virtual Machine needs to be started, after downloading. This not only adds more traffic to the congested network, but the waiting time to start a program is simply too long.

In summary, the current enterprise computing architecture involving Fat Client Computing has become a major concern with regard to its high total cost of ownership, considering its problems of management, maintenance, access, performance and security. Thin Client Computing, an important step in solving these problems, has performance bottlenecks that limits its wide acceptance.

The other big challenge facing today's Enterprise Computing is how to adapt to the Internet. This is where web-based computing comes to play in enterprise computing.

As a simple example, today's companies are trying to use the Internet to communicate more effectively. For instance, UPS lets customers track their packages from its web site, and their IT infrastructure has to adapt to this requirement. UPS has to have programs and computers able to talk to their order tracking system, which may be running on a mainframe. The company has to provide a system which talks to a database system which contains all the information about the customer, which might be running on a Unix server. Moreover the company needs a web server and the ability to publish the information to the web at the user's request.

UPS is just a very rudimentary example. There are lots of things companies want to do but can not do them because of the limitations associated with currently available technologies. For example, a sales person in Australia may want to check an inventory system which is running on a mainframe system in New York. How can this be accomplished? One way is to rewrite the program on the mainframe so that it can responds to requests coming from the Internet. This will take a long time to develop and may break down the entire system.

The other approach is to leave the mainframe system running as it is, but build an expensive high bandwidth network connecting the Australia office and the New York Office. It is also necessary to install a client program on the sales person's desktop, which talks to the mainframe. Thus the sales person can use the client program on his desktop to obtain the inventory information from the mainframe in New York. This is the typical Fat Client Computing approach.

Another approach, enabled by the current Thin Client Computing approach, is to have a web server that is connected to the mainframe and have Java Applets stored in the web server. The sales person can simply go to the URL of the web server, download the Java Applet to his desktop and run it from his web browser. The Java Applet talks to the web server, and the web server talks to the mainframe system. As a result, the sales person can get the information he needs. This is the most cost-effective approach. However, performance issues and long waiting times prevent the sales person from being willing to try.

If there were to be a way to run business-critical applications over the web, with good performance, the above problems would not exist.

SUMMARY OF THE INVENTION

The subject invention follows the direction of Java Applet/ActiveX based Thin Client Computing approach, which enables running applications over the web, yet avoids the problems associated with this approach, namely the long waiting time to start up a client program, the need to download a large size program, and loading up the already congested network.

In order to avoid the above problems, the subject invention uses JavaScript/DHTML powered web pages as client programs instead of using Java Applet client programs. In so doing, the subject invention takes the backend of Thin Client Computing but replaces its front end, which is the Java Applet client program. JavaScript/DHTML powered web pages are able to deliver a rich featured Graphical User Interface, or GUI, mimicking or copying the original GUI of the application. By using a backend server at which the application is run, coupling the backend server to a web server, and transmitting webpages to a client running a JavaScript/DHTML web browser, the relatively slow Internet can be used, while at the same time providing extremely satisfying performance. In one embodiment it takes only 4 seconds to start a rich full-featured client program, a 10–20 times performance increase compared to Thin Client Computing.

The subject invention not only solves the problem of running applications on the Internet, it also has a profound impact on Enterprise Computing within the corporate environment. Though many companies have high speed networks, these companies can never keep up with network bandwidth requirements. With the subject invention, companies can reduce their bandwidth requirements and deliver the same or better results, while reducing IT infrastructure complexity and cost.

More particularly, in order to solve the above problems with enterprise computing and web-based computing, an architecture is provided for delivering applications over a network, be it Internet or Intranet, in which the application is 100% running on its own server. Each application is presented to client machines via an HTML-based Graphical User Interface or GUI that looks exactly or almost exactly the same as the original GUI of that application.

While it is recognized that HTML has been used for web-based computing, it is limited to very simple applications, and the user interfaces of these programs are dramatically different from the traditional Windows-like GUI that people are used to seeing.

Here, using HTML to construct a Windows-like GUI is part and parcel of the subject invention. It is noted that many have been using HTML for years but were unaware of its power.

To construct a GUI using HTML requires development of a common set of GUI controls such as window, menu, toolbar, icon, scroll, and taskbar. This set of controls, referred to as the "foundation class", is a major advancement in fully utilizing HTML. It is only possible to construct a windows-like GUI based on this foundation class, which in turn is based on JavaScript and DHTML which are used to develop such a set of GUI components. The difference between HTML without and with this set of controls is similar to the difference between DOS and Windows Operating Systems.

More specifically, traditionally HTML has been used for describing web pages, which features hyperlinks, texts, and images. But very few have imagined that HTML, used together with client-side scripting, can be used to construct a full-featured Windows-like GUI environment, composed of windows, menu, toolbar, task bar, scroll, edit control, tree view, list view, and multiple document interface or MDI. In the subject invention, in one embodiment, a set of common GUI components, with necessary management and communication components, is constructed using Dynamic HTML and JavaScript. This set of components, including window, pop up window, menu/popup menu, tree, table, dialog, scroll, edit control, tool bar, event management, and communication management is constructed beforehand and is used as a foundation for presenting the application's Graphical User Interface in the exact or similar fashion to its original look and feel.

The Graphical User Interface constructed on top of this foundation is extremely lightweight, on the order of kilobytes. It is based on the widely accepted industry standard, HTML, and is viewable from any popular web browser. It is a feature of the subject invention that the Graphical User Interface mimics the original GUI very well, and delivers performance equal to the original.

Using a computing architecture based on the above-mentioned HTML-based GUI and a Remote Display protocol such as X-Windows, RDP, or ICA, the subject system can deliver almost any application over the web, especially the Internet.

The architecture, in one embodiment includes a client GUI program, which is HTML-based; a web server and an application server which acts as an translation engine; and Window/Unix backend servers on which the applications are running. This architecture enables true web-based computing. As mentioned, people have been using remote display protocols to deliver applications over high speed networks, but can not do this over slow networks. Even when they do, the performance is poor.

The above-mentioned computing architecture, based on the HTML-based GUI, and a Remote Display Protocol, can be used to solve the above-mentioned problems in Enterprise Computing in a way that Thin Client Computing cannot.

Thin Client Computing is an attempt to solve problems associated with Enterprise computing. However it has problems as well and thus it is not as widely used as it should be. Thin Client Computing typically uses one or several remote display protocols and uses either a native client, a Java client or a web client to present the GUI of an application to a client machine. The major problem comes from the client program that the native client needs to install, or from the fact that the Java client and web client requires a long time to download and initialize and adds traffic to the congested network.

In contradistinction, the subject invention replaces the client program with the above-mentioned HTML-based GUI and utilizes the backend of thin computing, which is the remote display protocol and its servers. The HTML-based GUI functions and behaves as well as or even better than these Thin Clients, but requires 10 times less time to download and start. Moreover, it does not add significantly to the traffic on the network.

Using the above mentioned architecture, it is now possible to deliver applications not only in an enterprise environment and the Internet, but also to handheld information appliances such as the Palm Pilot and wireless phones, since the lion's share of the computing is done on the network instead of at the handheld or portable device.

It will be appreciated that in the subject invention network-based computing is utilized in which the application is never downloaded to the client. Rather, the application is run completely on the backend server, with communication between client and server being through the transmission of requests or responses, which takes the form of web pages. The result is that the slow networks like the Internet can handle the communication, as web pages can be transmitted at 20 Kb/sec, clearly within the capability of a 56 Kb/sec modem.

Since the application is run on a backend server, the computer power at the client is minimal, making possible the use of handheld portable computing devices. Since no programs are downloaded and the client program is minimal, there is no waiting at the client side. Web pages powered by GUI components based on JavaScript and Dynamic HTML offer a pleasing full-featured Graphical User Interface, with the system offering unlimited scalability and high availability. The subject system also enables universal access to applications and data, eliminating performance problems which blocked usage of the Internet or slow local area networks for network-based computing. Use of web pages and associated browsers also offers high security without bogging down performance through the use of the Secure. HyperText Transfer Protocol, HTTPS.

In one embodiment, the entire client program is based on standard HTML technology, mainly JavaScript, Dynamic HTML and Cascading Style Sheet. This client program is extremely lightweight but is able to construct a rich full-featured graphical user interface with the same look and feel as traditional software running on Windows and Unix. An application server and a web server reside between the client and the server. While the web server is responsible for handling HTTP requests, the application application server acts as a translation engine, translating the server program's display information into web pages using GUI components constructed on top of HTML, ie. Javascript and DHTML, in real time and translating client machine events into the protocol that the backend server understands. A typical computation process is described below:

1. User goes to a client machine's web browser, enters the URL of the web server;
2. Upon the HTTP request, the web server sends back an HTTP response to the user's web browser. The response may or may not contain requests asking the user to log on.
3. Upon the successful validation of the user if logon is required, an HTML page is displayed in the client machine that contains information about available applications to that specific user.
4. User clicks on one of the applications. Upon the click, the client program automatically launches a window representing the graphical user interface of that application. At the same time, the user click information is sent back to the web server;
5. Upon receipt of the user click information, the web server may load a predetermined HTML page on the web server and send it back to the web browser, or just pass the information to the application server;
6. Upon receipt of that information, the application server may just do some local processing and send the processing result back to the web server; or the application server will send the information to the appropriate backend server via an appropriate protocol determined beforehand.
7. The backend server responds to the received information, such as opening a file or popping up a message box. The response of the backend server is sent to the application server via a predetermined protocol;
8. Upon receipt of the response, the application server translates the response into HTML, utilizing GUI components constructed beforehand if necessary, and sends it to the web server.
9. The web server sends the translated HTTP response from the application server to the client web browser;
10. Upon receiving the response from the web server, client web browser performs processing as programmed.
11. User generates another request and the above process repeats in a similar fashion.

The communication between the client web browser and the web server is largely based on HTTP or HTTPS. The front end of an application is presented in a client machine's web browser in a pleasant, familiar Graphical Use Interface, which is constructed by standard HTML technology, mainly using client side script and DHTML. Since it is based on HTML technology, the client program is much more lightweight than traditional Thin Client technologies.

Besides all of the benefits that traditional Thin Client Computing has, the subject system solves the performance bottleneck that troubled traditional Thin Client Computing and offers the following additional benefits:

First, there is a much lower requirement of network bandwidth compared to traditional Thin Client technologies. This makes it possible to deliver applications through not only Intranet, but also the Internet. Performance is still very satisfying even running through a 56 Kb/sec dialup connection. Thus the subject system completely eliminates the bottleneck of web-based computing.

Secondly, there is a much shorter start up time associated with the subject system. Traditional web-based Thin Client Computing requires downloading a program through the web, initiating a Java Virtual Machine if it is an Applet, and starting up the program. This means that the user will not be able to see any feedback until a minute after he sends the request. With the subject system, this performance bottleneck is eliminated as well. Since the client portion is entirely HTML, the user will be able to get feedback within seconds or less.

Thirdly, the Client program is several times smaller than traditional Thin Client programs, thus reducing downloading time by several times.

Fourthly, there is an even lower requirement of client machine. All that is required is that client machine have a web browser that understands standard DHTML and client-side script, such as JavaScript and VBScript.

Fifthly, there is a pleasant Graphical User Interface on the client side by leveraging the power of the web browser, client-side scripting and DHTML. This enables constructing a Graphical User Interface with the exact same look and feel as traditional software, such as Windows applications.

Moreover, there is unlimited scalability and high availability, with the subject system truly enabling universal access to applications and data. While many traditional Thin Client Computing technologies declare this, the reality is that their performance problems stop people from using them over the Internet.

The subject system also features high security without boggling down performance. If necessary, the client program can communicate with the web server through HTTPS, the standard secure protocol that the industry uses today for important transactions. Since popular web browsers have HTTPS built in, using HTTPS for communication will only have a minimal impact on the program's performance. This is in contradistinction to traditional Thin Clients, in which implementing HTTPS or similar protocols significantly increases the size of the client and slows down the client.

Further, a system is provided for running applications on a desktop or portable computing device having limited computer power, with the web used as the computing environment and with communication between client and server being via the transmission of client-side script and DHTML powered web pages. The result is that it overcomes the bottleneck of current web-based computing not being able to construct a rich full-featured Graphical User Interface with the same kind of look and feel as traditional software, and not being able to deliver traditional software over the web, especially the Internet, with a user-pleasant experience.

This also means that the running of applications is not limited by the computing power available at the device at which the application is run, but rather only by the Internet and the web or application server.

In summary, a computing architecture runs applications on a backend server coupled to an application server, which is in turn coupled to a web server. The web server communicates with a client that is running an HTML-based Graphical User Interface that mimics the original Graphical User Interface of the application. This computing architecture permits the use of relatively slow speed networks such as the Internet or a wireless link between the client and the web server while maintaining the same level of performance as would be expected if the application was running on the client itself, with the communication between the client and the web server involving transmitting web pages to the client and with the client transmitting requests back to the web server in one embodiment via the HTTP protocol. The use of the HTML-based Graphical User Interface provides the user with the same kind of user experience as if he was running the application on the client machine, but without the problems associated with Thin Client Computing such as downloading Java applets or installing a specialized client program for the Graphical User Interface. The subject computing architecture thus permits the use of slow speed networks and computing terminals with limited processing power to run applications that are only available on high speed networks or powerful computers. The use of the subject architecture also permits centralized management of the applications and the data, which in turn permits easy upgrades and maintenance. As a central feature, the subject architecture permits delivery of applications and information over the Internet or other slow speed networks without rewriting the programs and without slowing down performance.

DETAILED DESCRIPTION

Figure 1:
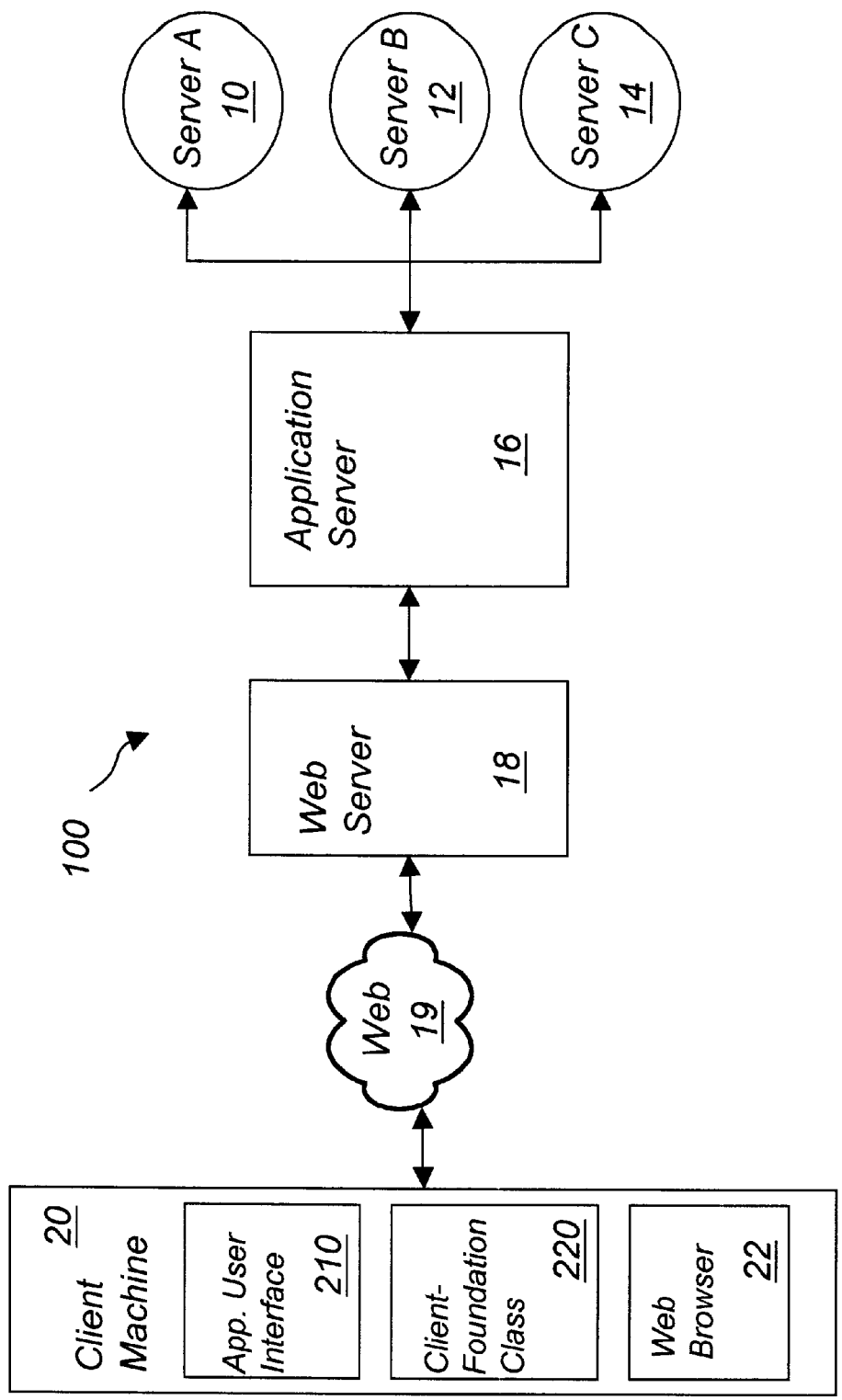
FIG. 1 is a block diagram of the computer system of this invention.

By way of further background, one of the problems associated with enterprise computing involving connecting different computing resources together and enabling their interactions. Today a typical well-established company's IT infrastructure includes disparate hardware systems, including mainframe, server, desktop, notebook, and other network-connected computers, as well as windows based terminals and handheld information appliances. The IT infrastructure also includes software systems. These software systems include legacy applications running on mainframe systems, and database systems running on powerful Unix servers. Moreover, Enterprise Resource Planning software is spread across a range of servers, workstations and desktops, with office productivity applications running on Windows. Network systems that are typically used in Enterprise Computing include LANs, WANs, Virtual Private Networks, dialup connections, and ISDN. Workers are now spread around the world in branch offices, homes, hotels, customer's sites and many other places. The cost and complexity of delivering the right applications and data to the right person at the right time and in the right place are becoming overwhelming.

So far the so-called Fat Computing architecture has been used in enterprise computing. A great concern associated with Fat Client Computing is the soaring total cost of ownership that is incurred over the life of a PC. In the past, much attention was focused on the initial acquisition costs to create an enterprise computing environment having large numbers of desktops, rather than the on-going costs of PC ownership. Most of this cost is attributed to massive increases in the labor needed to deploy, control and maintain applications. For a large, distributed enterprise computer systems with thousands of PCs, this can add up to millions of dollars in increased costs every year.

Then there is the problem of unsatisfying performance. Fat Client Computing's performance depends highly on network bandwidth. While network speed has increased dramatically in the last decade, it is still far away from satisfying the bandwidth requirement imposed by Fat Client Computing. As a result, though enterprises invested heavily in building high performance networks, computer system performance is still a bottleneck in productivity.

Another problem associated with fat computing is the fact that it is unreliable and unmanageable. This is because of Fat Client Computing's distributed nature and high dependence on network performance which make it unreliable and very difficult to manage. Data loss, virus invasion, mis-deleted files, and hard drive failures result in computer system downtime and result in a significant cost item for companies.

Moreover, using Fat Client Computing over the Internet is painful because the connection is much too slow and because each user must have the client application, a relatively large program, installed on his computer.

If it were possible to shift the computing load to a server, not only would there be no necessity for downloading Fat Client programs to the desktop, all maintenance and upgrades could be done on the server, attended to by trained professionals. Moreover, even as to word processing, if the processing were done at the server, crashes caused by inexperienced desktop users could be avoided, with all data preserved at the server. In short, by shifting the running of applications to the server, downloading would be minimal or eliminated, software upgrades could be universally applied and maintenance made to occur at one point instead of at each of the many desktops. Moreover, less data and work product would be lost due to the expertise of those responsible for the server.

Additionally, if computing were to be able to be shifted to, for instance, a web server, then portable computing devices would not have to have massive storage and fast processors. With palmtops and more recently wireless handhelds, these devices have only limited computational power and battery life. Were it possible to use the low speed Internet connection and shift the computation workload away from these portable devices, applications run on fast large machines could be delivered to the portable device without having to increase the computational power of the device or increase battery life.

As mentioned above, Thin Client Computing came out of the need to reduce total cost of ownership associated with traditional Fat Client Computing. Currently the most widely accepted Thin Client Computing model is based on X-Windows, Microsoft Terminal Server and Citrix technologies. This computing model completely separates an application from its user interface. While the application is 100% running on the server, its user interface is presented on the client machine, which is purely used for user interaction. The user's input, such as keyboard strokes/mouse movements, originated at the client machine, are transmitted back to the server via the network. The server's application processes these events and sends its output to the client machine. The communication between client and server is through well-established protocols, such as X-Windows Protocol, Microsoft Remote Display Protocol (RDP) or Citrix Independent Computing Architecture (ICA).

Thin Client Computing based on this architecture is an important advancement in computing. By running applications 100% on the server, the processing power required by client machine is dramatically reduced. Sometimes it may not even need a full-blown operating system. A PC based on the Intel 386 processor will have enough power to process display information and transmit user inputs back to the server. This enables centralized application deployment, management and backup, increasing availability and reducing maintenance costs. This also enables heterogeneous access to applications on different platforms. A client machine running on Unix can access Windows applications easily.

However, these solutions still have serious factors that limit the wide acceptance of Thin Client Computing. These limiting factors are as follows:

First, in order to communicate with a server, a client machines needs to have a client program, regardless of whether it is a native program, a Java program or a web-enabled program. Installing and maintaining these client programs repeats the same problem that Thin Client Computing is trying to avoid, namely the time and resources it takes to install and maintain programs on different desktops.

Secondly, communication protocols still require good bandwidth that makes them difficult to run over the Internet. Most protocols are geared towards a high-speed Intranet connection, which is typically on the order of Megabits per second, while the typical Internet connection is about 56 Kb/sec.

More ever, Thin Client Computing can not serve the growing need of web-based computing well either. Propelled by the rapid growth of the Internet, Application Service Provider market is burgeoning. Companies feel urgent needs to deploy applications over the web, while consumers dream of universal access to applications, no matter where, when and what kind of connection, be it ISDN, Intranet, Dialup or even wireless. Current Thin Client Computing technologies using Java Applet/Browser Plugins/ActiveX can offer these capabilities. They represent an important step forward towards web-based computing. Client programs written in Java Applet or browser plugin form do not require installation beforehand. They can be downloaded and configured on the fly. This gives a lot of promise to web-based computing. However, in order to run a web-based client, the user has to wait for quite a while, usually on the order of minutes, to get the program downloaded, initiated and executed. And users have to go through this process every time when users want to run the application. This is a major problem limiting the wide acceptance of web-based computing.

By way of further background, currently available thin computing approaches include the Network Computer, NC, approach. Touted by Oracle's Ellison in 1996, this approach has largely been abandoned. One reason is that NC runs, on Java technology. Using the NC approach the computer at the client side needs to download applications, written in Java, from the server, and to execute the downloaded application on its own processor. Though this approach enables centralized management of applications, it imposes a large demand on network bandwidth and also demands reasonable processing power from the client machine.

What is necessary is a computing architecture that enables the running of applications over the relatively slow 56 Kb/sec Internet connection without obvious performance depreciation. The subject invention is about such a computing architecture that enables running applications over the web at a very satisfying performance, even when the connection is slow.

Referring to the sole drawing figure, in one embodiment backend servers 10, 12 and 14 are the servers on which the applications are run. Server 10, here labeled Server A, runs applications on Unix. Applications can also be run on Windows, through the use of a Windows Terminal Server or a Citrix MetaFrame/Winframe server 12, shown here as Server B. Applications can also be run on a Linux server 14, here shown as Server C. What will be appreciated is that there are a number of platforms on which applications can be run.

In Fat Client Computing the possibility of using different platforms is expensive because of the incompatibility between different platforms.

Each of the back end servers is connected to an applications server 16 which serves to translate between the particular server and the web server, here shown at 18. Thus Unix communicates with the application server via X-Windows over an intranet connection, whereas the Windows server communicates with the applications server via the IDC or RDP protocols. The Linux server in general uses an X-Windows protocol.

It will be appreciated that applications server 16 communicates with the web server via a single protocol, in one embodiment HTTP. Thus the different platforms are translated into a single convenient protocol, that which is used commonly for the Internet as well as for intranet connections. HTTP is used because the response from the application server can be sent to the client directly without any conversion.

Web server 18 is connected to a client machine 20 via a network whose speed is not at issue. Thus the connection can be via the Internet, a wireless link or a local low speed network such as available via the use of twisted pairs. In the subject invention HTML webpages are sent from the web server to the client, whereas responses in the form of HTTP requests are transmitted from the client to the web server.

The client machine uses a web browser and the aforementioned HTML-based Graphical User Interface to present the running application to the user and to communicate requests back through the web server to and the application server to the backend server for processing.

In operation, for instance for an Oracle Database program which is hundreds of megabytes in size, with data on the order of terabytes, this program is run on a Sun Enterprise Server. The connection to the application server is over a T1 connection which runs at 10 Megabits/sec. The application server is typically a Windows NT server with two Pentium III 500 Mhz processors, for a total of 128 Megabytes of memory. The application software is specially designed to translate the X-Windows protocol used by the Unix server to that used by the web server. The web server is connected to a number of desktops via a slow speed network that needs only have a 56 Kb/sec speed. The desktop computers may be any of a number of Windows-based terminals running a web browser such as the Internet Explorer or the Netscape Communicator. The computer power necessary at the client machine need only be 12 megabytes of memory, with a 486/66 Megahertz processor or less. This is because all of the computing for the application is done at the backend server.

In one embodiment, the user interface of the database program is presented and controlled inside the web browser through the use of JavaScript and Dynamic HTML. This presents the user with the Graphical User Interface that mimics the Graphical User Interface of the application. The fact of using this interface coupled with the transmission of the application to the client in HTML permits accessing the application through slow 56 Kb/sec networks without slowing down the process measurably. Thus what the user sees is identical to the same application run locally, but without the necessity of either downloading the application to the client or suffering the delays associated with slow network connections in general.

The subject system thus makes possible the use of so called dumb terminals such as palmtops or wireless terminals, since all of the computing power is at the backend server. Since bandwidth and network speed is not an issue, Enterprise Computing resources can be accessed by remote users easily, with maintenance and upgrades taken care of at one point, that being the backend server.

Figure 2:
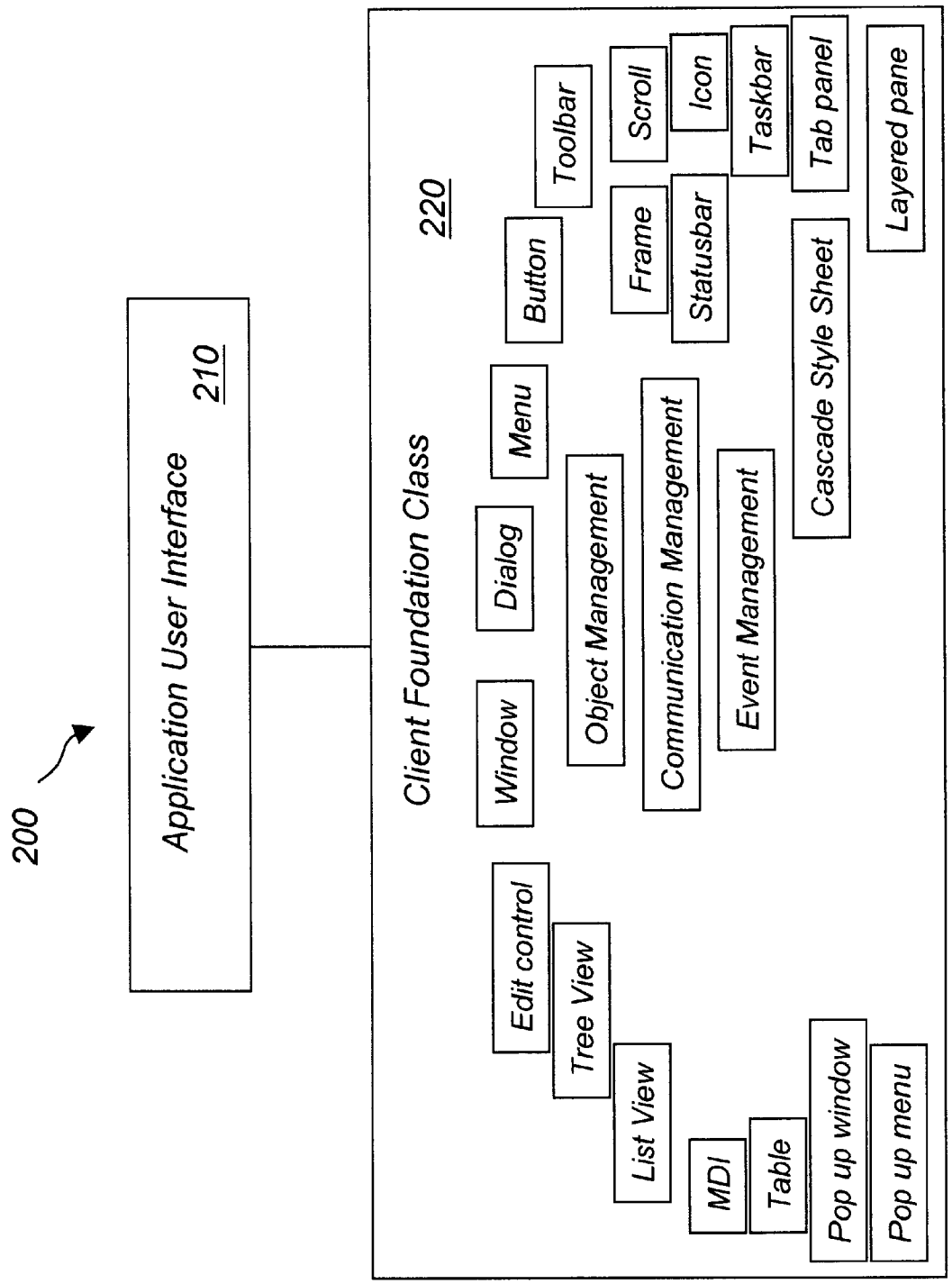
FIG. 2 is a block diagram of the client foundation system of the invention.
Figure 3:
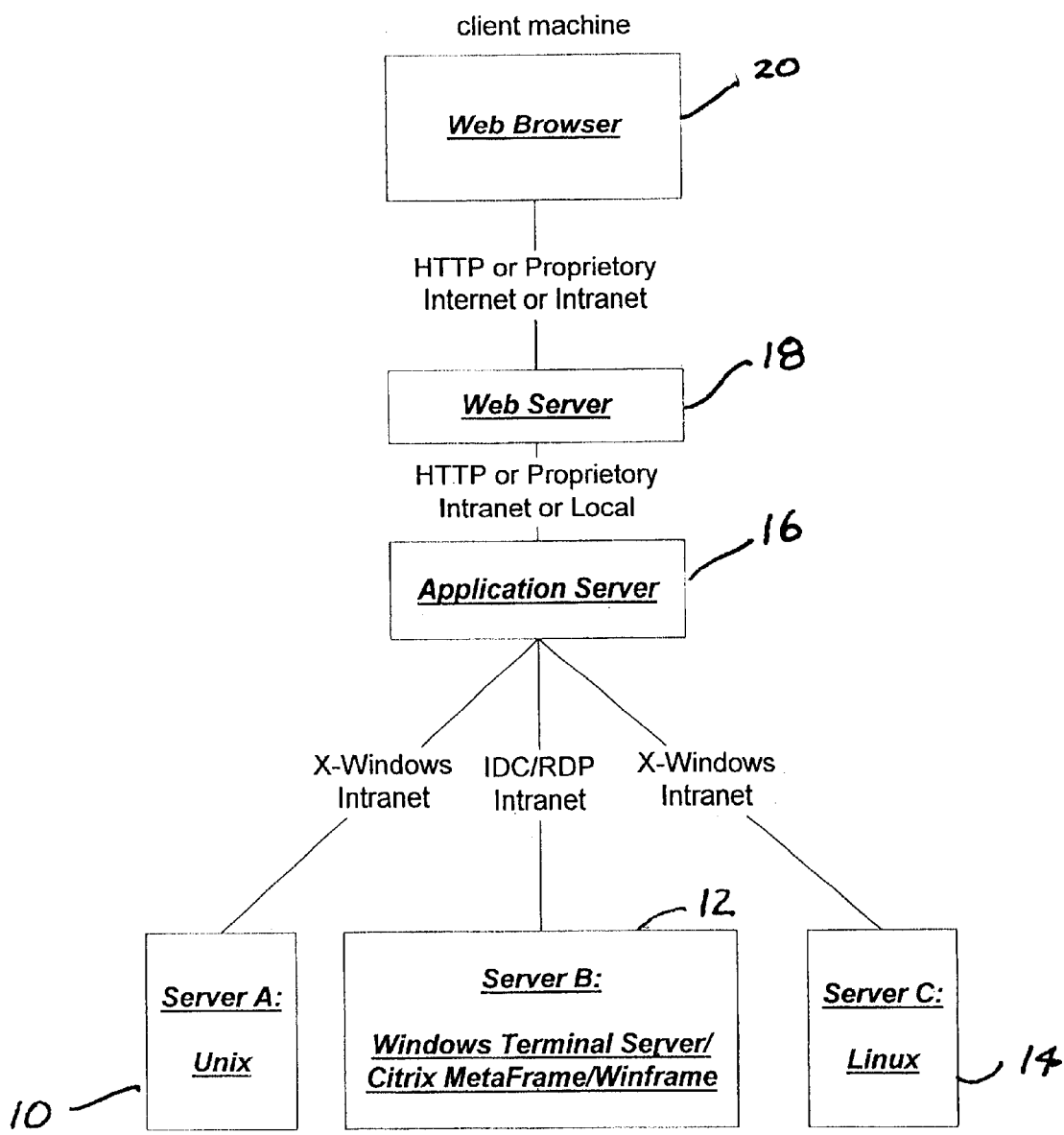
FIG. 3 is a block diagram of the computer system of this invention.

An example of a source code written in JavaScript to implement a simple embodiment of the subject invention is shown in FIG. 2 and in Appendix A, incorporated herein by reference.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for running a rich applications over a network by a system, said system comprising a backend server, an application server connected to said backend server, a web server connected to said application server, and a client machine comprising a web browser and a client foundation class and being connected to said web server via said network, said method comprising the steps of:

running said rich application on said backend server wherein said rich application comprises a graphical user interface (GUI) having a set of controls used to control and execute said rich application;

generating and sending an information of said GUI to said application server;

converting said GUI information into one or more web pages and one or more client-side scripts by said application server;

routing said one or more web pages and said client-side scripts to said client machine via said web server;

processing said one or more web pages and said one or more client-side scripts by said client foundation class and producing an application user interface comprising at least one control of said set of controls of said GUI: and executing said client-side scripts by said client foundation class thereby controlling interactions of a user with said application user interface.

2. The method of claim 1, wherein said client-side scripts comprise JavaScript.

3. The method of claim 1, wherein said client-side scripts comprise VBScript.

4. The method of claim 1, wherein said network is the Internet.

5. The method of claim 1, wherein said network is a local area network.

6. The method of claim 5, wherein said local area network is a bandwidth-limited slow speed network.

7. The method of claim 1, wherein said network comprises a wireless network.

8. The method of claim 1, wherein said client machine has a limited computing capacity.

9. The method of claim 8, wherein said client machine is a wireless device.

10. The method of claim 8, wherein said client machine is a palmtop device.

11. The method of claim 8, wherein said client machine is selected from a group consisting of workstations, desktops and laptops.

12. The method of claim 1, wherein said backend server, said application server and said web server are combined into one entity.

13. The method of claim 1, wherein said set of controls of said GUI comprises at least one control selected from a group consisting of window, dialog, menu, button, multiple windows, toolbar, tree table, tab panel, popup menu, edit control, tree view, list view, table, scroll, icon, frame, status bar, task bar, cascade style sheet, layered pane, and multiple document interface.

14. The method of claim 1 wherein said client foundation class comprises a set of controls selected from a group consisting of window, dialog, menu, button, multiple windows, toolbar, tree table, tab panel, popup menu, edit control, tree view, list view, table, scroll, icon, frame, status bar, task bar, cascade style sheet, layered pane, and multiple document interface.

15. The method of claim 1 wherein said client foundation class is implemented using Dynamic HTML and JavaScript.

16. The method of claim 1 wherein said client foundation class is implemented using Java programming language running as a Java Applet.

17. The method of claim 1 wherein said client foundation class is implemented using Java programming language running as a Java application.

18. The method of claim 1 wherein said client foundation class is implemented using ActiveX.

19. The method of claim 1 wherein said client foundation class is implemented using a web browser plugin.

20. A computer system for executing a rich application over a network connection comprising:

a backend server adapted to store and execute said rich application, wherein said rich application comprises a Graphical User Interface (GUI) having a set of controls used to control and execute said application;

an application server being connected to said backend server and adapted to receive an information of said GUI and convert said GUI information into one or more web pages and one or more client side scripts;

a web server being connected to said application server and adapted to receive and transmit said one or more web pages and said one or more client-side scripts;

a client machine being connected to said web server via said network connection and comprising a web browser and a client foundation class, wherein said client foundation class is adapted to receive said one or more web pages and said one or more client-side scripts, to produce an application user interface comprising at least one control of said set of controls of said GUI and to execute said client-side scripts thereby controlling interactions of a user with said application user interface.

21. The computer system of claim 20, wherein said client foundation class comprises a set of controls selected from a group consisting of window, dialog, menu, button, multiple windows, toolbar, tree table, tab panel, popup menu, edit control, tree view, list view, table, scroll, icon, frame, status bar, task bar, cascade style sheet, layered pane, and multiple document interface.

22. The computer system of claim 20, wherein said client foundation class is implemented using Dynamic HTML and JavaScript.

23. The computer system of claim 20, wherein said client foundation class is implemented using Java programming language running as a Java Applet.

24. The computer system of claim 20, wherein said client foundation class is implemented using Java programming language running as a Java application.

25. The computer system of claim 20, wherein said client-side scripts comprise JavaScript.

26. The computer system of claim 20, wherein said client-side scripts comprise VBScript.

27. The computer system of claim 20, wherein said client-side scripts comprise Java.

28. The computer system of claim 20, wherein said set of controls of said GUI comprises at least one control selected from a group consisting of window, dialog, menu, button, multiple windows, toolbar, tree table, tab panel, popup menu, edit control, tree view, list view, table, scroll, icon, frame, status bar, task bar, cascade style sheet, layered pane, and multiple document interface.

29. The computer system of claim 20, wherein said one or more web pages comprise an HTML format.

30. The computer system of claim 20, wherein said backend server, said application server and said web server are combined into one entity.

* * * * *